US009063012B2

(12) United States Patent
Thorne

(10) Patent No.: US 9,063,012 B2
(45) Date of Patent: Jun. 23, 2015

(54) IR DETECTOR SYSTEM AND METHOD

(75) Inventor: Peter Michael Thorne, Basildon (GB)

(73) Assignee: SELEX ES LTD, Essex (GB)

( * ) Notice: Subject to any disclaimer, the term of this patent is extended or adjusted under 35 U.S.C. 154(b) by 90 days.

(21) Appl. No.: 13/202,916

(22) PCT Filed: Feb. 23, 2010

(86) PCT No.: PCT/EP2010/052289
§ 371 (c)(1),
(2), (4) Date: Aug. 23, 2011

(87) PCT Pub. No.: WO2010/097389
PCT Pub. Date: Sep. 2, 2010

(65) Prior Publication Data
US 2011/0303846 A1    Dec. 15, 2011

(30) Foreign Application Priority Data
Feb. 24, 2009   (GB) ................................ 0903095.8

(51) Int. Cl.
*H01L 25/00* (2006.01)
*G01J 5/00* (2006.01)
*G01J 5/24* (2006.01)
*G01J 1/44* (2006.01)
*H04N 5/33* (2006.01)
*H04N 5/3745* (2011.01)

(52) U.S. Cl.
CPC .... *G01J 5/24* (2013.01); *G01J 1/44* (2013.01); *H04N 5/33* (2013.01); *H04N 5/37452* (2013.01)

(58) Field of Classification Search
CPC . H04N 3/155; H04N 3/3745; H01L 27/14601

USPC .............................................. 250/332, 338.1
See application file for complete search history.

(56) References Cited

U.S. PATENT DOCUMENTS

| 5,083,204 | A * | 1/1992 | Heard et al. .................. 348/164 |
| 7,492,399 | B1 | 2/2009 | Gulbransen et al. |
| 2004/0169753 | A1 | 9/2004 | Gulbransen et al. |
| 2008/0074524 | A1 | 3/2008 | Panicacci |
| 2010/0128157 | A1 | 5/2010 | Panicacci |

FOREIGN PATENT DOCUMENTS

| WO | WO 2004/074789 A1 | 9/2004 |
| WO | WO 2008/027193 A2 | 3/2008 |

OTHER PUBLICATIONS

MT-083 tutorial, comparator basics, p. 1, published by Analog Digital Devices, 2009 available at: http://www.analog.com/static/imported-files/tutorials/MT-083.pdf.*

(Continued)

*Primary Examiner* — David J Makiya
*Assistant Examiner* — Kenneth J Malkowski
(74) *Attorney, Agent, or Firm* — Buchanan Ingersoll & Rooney PC

(57) ABSTRACT

An Infra Red detector system and method is disclosed. There is benefit in providing signal processing functions into each pixel of a 2D focal plane IR detector for applications such as hostile target detection. The thermal characteristics of muzzle flash or a projectile and it's trajectory for example are distinguishable from background scene. A technique to add a signal detection function to normal IR detector thermal imaging operation to a standard direct inject Integrate While Read (IWR) pixel circuit and for providing target detection at extremely high data rates is described.

7 Claims, 3 Drawing Sheets

(56) References Cited

OTHER PUBLICATIONS

International Search Report (PCT/ISA/210) issued on Jul. 5, 2010, by European Patent Office as the International Searching Authority for International Application No. PCT/EP2010/052289.

Written Opinion (PCT/ISA/237) issued on Jul. 5, 2010, by European Patent Office as the International Searching Authority for International Application No. PCT/EP2010/052289.

Naseem Y. Aziz et al., Standardized High Performance 640 by 512 Readout Integrated Circuit for Infrared Applications, Infrared Technology and Applications XXV, Apr. 5-9, 1999, Orlando, FL, USA, vol. 3698, pp. 766-777.

* cited by examiner

Direct Inject pixel schematic

Direct inject pixel schematic with
Sample and hold function for IWR

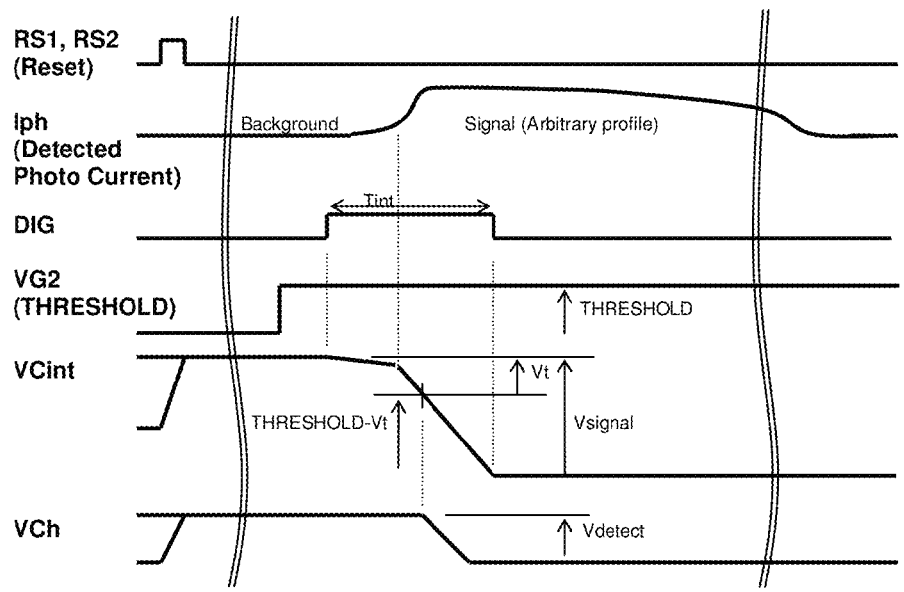
Figure 3 Signal detection timing diagram
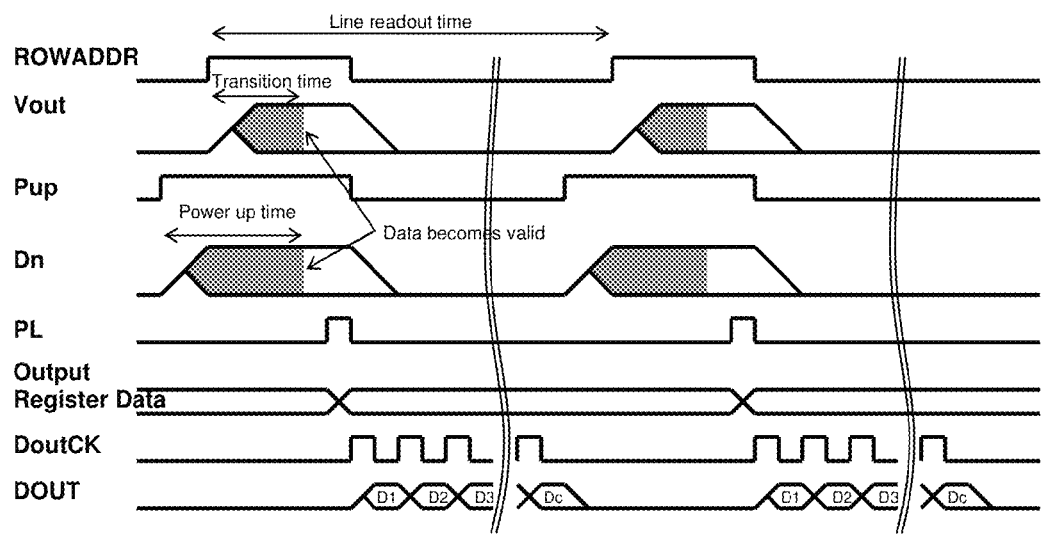
Figure 4 Signal processing and data output timing diagram

IR DETECTOR SYSTEM AND METHOD

The invention relates to an Infra Red (IR) detector system and method. More specifically but not exclusively it relates to an IR detector system equipped with in pixel target detection operating in a full TV format.

It is a problem with prior art IR detector systems that data is provide at speeds below that required for target detection. This prevents detector operation at high frame rates required by applications such as detecting muzzle flash or projectile trajectories. Other systems exist that use out of pixel or external signal processing and numerical techniques to determine similar target information. By their nature they are slower and introduce latency.

According to the invention there is provided an IR detector system comprising at least one comparator and a Focal Plane Array (FPA) detector pixel in which a skim circuit is provided in the FPA detector pixel to provide in-pixel signal processing such that signals over a certain level are identified.

In this way, the present system overcomes the problems of the prior art. This IR detector technology can be used for normal thermal imaging operation and for target detection applications either separately or in combination. The signal threshold detection technique and digital readout method embodied in the embodiments of the invention described below provides a means to deliver high speed data, enabling detector operation at extremely high frame rates as required by applications such as detecting weapon muzzle flash or projectile trajectories.

The invention will now be described with reference to the following drawings in which;

FIG. 3 is a schematic diagram showing signal detection timing in accordance with one form of the invention; and FIG. 4 is a schematic diagram showing signal processing flow and data output timing in accordance with one form of the invention.

Figure 1A:
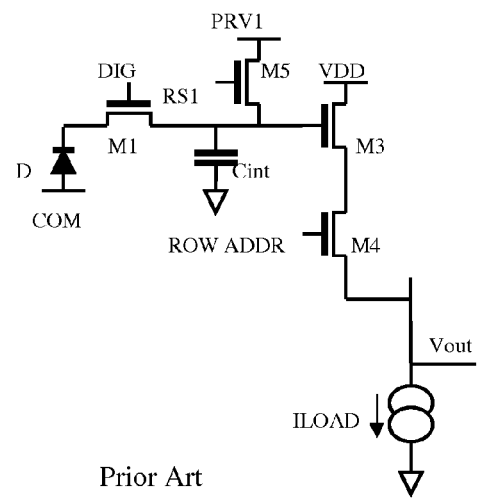
FIG. 1(a) is a schematic diagram showing a Direct Inject Gate (DIG) pixel circuit.

As shown in FIG. 1, Infra-Red focal plane 2D array detector pixel circuits often use the Direct Inject Gate (DIG) circuit of the form shown in FIG. 1(a). They are simple and perform well across a range of applications and are widely described elsewhere. Each pixel comprises a Direct Inject transistor (M1), an integration capacitor (Cint) a reset transistor (M5) and an output source follower transistor M3. Firstly, the integration capacitor Cint is reset to the Pixel Reset Voltage PRV1 by pulsing transistor M5 RS1 gate input. Image data is acquired as a voltage on Cint by operating the DIG transistor M1 to bias the detector diode D with respect to the diode COMmon terminal. Diode photocurrent integrates signal charge from Cint for the duration the bias is applied, the integration time. Data is typically output from a 2D array a row at a time using the row address input (ROW ADDR) that operates transistor M4. The signal voltage across Cint is then output from the source follower transistor M3 which develops a voltage Vout across a current sink load that is then output from the array using a separate column multiplexer (not shown).

The simple Direct Inject circuit can be extended to provide an Integrate While Read (IWR) function by adding a transistor switch (M2) and storage capacitor (Ch) that are configured and operated as a sample and hold circuit. See FIG. 1(b). A separate reset transistor M6 allows the hold capacitor Ch to be reset to the voltage on PRV2 independently of Cint.

The circuit operates similarly to the direct inject circuit after which the hold capacitor (Ch) is reset to the Pixel Reset Voltage 2 (PRV2) level by pulsing the reset transistor switch M6 RS2 gate input. The sample and hold transistor switch M2 is turned on by applying a logic HIGH signal to VG2 input and by a charge share technique, the signal voltage across Cint appears across Ch. The input signal voltage is reduced proportionally by the ratio of the two capacitors Cint and Ch. Ideally Cint>>Ch to avoid unnecessary signal attenuation. The transistor switch M2 is turned off by applying a logic LOW to VG2 and a 'copy' of the attenuated signal remains on the hold capacitor. While transistor switch M2 is turned off the integrator circuit (D, M1, Cint and M5) may be operated independently of the readout circuit M3 and M4 to give the IWR function.

Using IC design layout techniques it is possible to put this circuit into each pixel of the array.

Considering just the two pixel capacitors Cint and Ch and the transistor switch M2, the circuit may be configured and operated differently. Configuring the circuit that drives the sample and hold transistor M2 gate VG2 to operate by providing a pulse to an intermediate voltage allows the circuit to operate differently in a so called 'skim mode' using the bias property of the transistor. As the voltage on the gate terminal increases with respect to the source terminal then at a critical voltage called the threshold voltage (Vt), the transistor turns on and current flows through the transistor drain—source when a voltage difference exists. For the range of signals of interest then in the case where the source and drain voltages appear across capacitors then using this skim configuration and operation when the transistor is on, the capacitor with the higher voltage will discharge into the other. Current flows until the voltage rise causes the transistor to switch off. A proportion of the signal is acquired and its value is determined by the voltage set on VG2 and input signal voltages and the ratio of the capacitors. Sufficient time must be provided for SKIM to be stable when applied and for the charge transfer operation to complete. In high signal cases especially, the capacitors may discharge further as expected which still provides detected signal information on Ch.

Figure 1B:
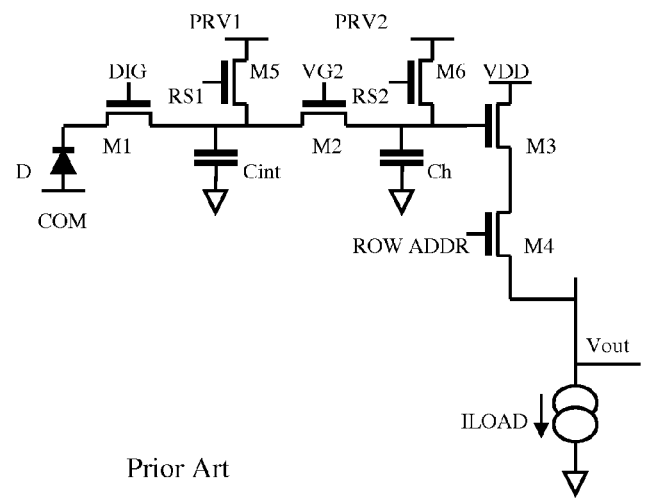
FIG. 1(b) is a schematic diagram showing a DIG circuit with sample and hold to implement an Integrate While Read (IWR) function.

Considering a 2D array of pixels of the form FIG. 1(b) where the connecting transistor M2 is configured to operate in skim mode the skim circuit can be configured and operated to provide an in-pixel signal detection function to identify signals over a certain level.

In this 2D array, the conventional approach to implementing the skim function by pulsing the SKIM voltage on transistor M2 gate terminal may be avoided by operating the circuit differently to simplify operation and give performance advantages.

Furthermore, a high speed comparator can be used to detect the change in voltage across Ch with respect to the detection reference level VRef to provide a digital output for detected target information.

Figure 2:
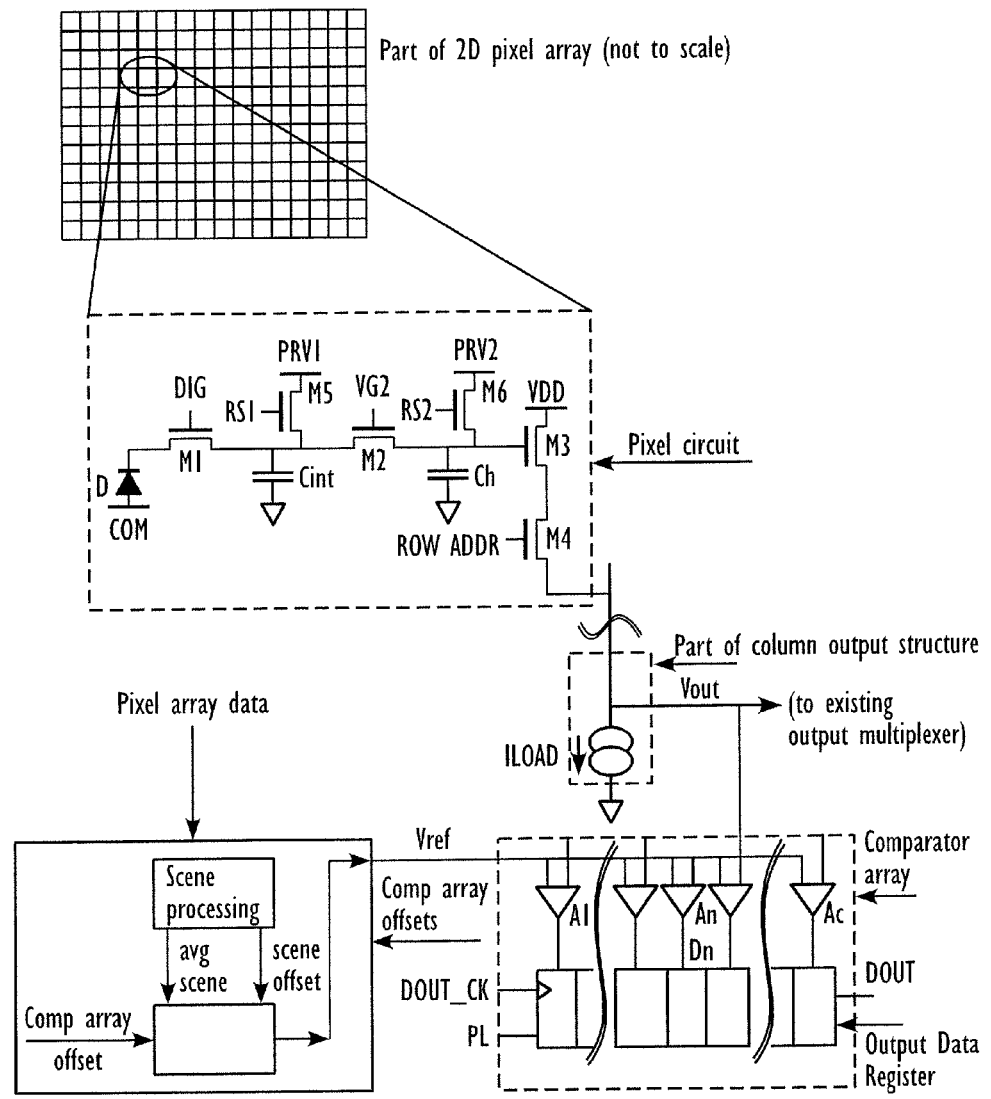
FIG. 2 is a schematic diagram showing one form of digital target detection architecture showing pixel to output signal flow in accordance with the invention.

Referring to the circuit arrangement of FIG. 2 the pixel circuit operates similarly to that described above. PRV1 and PRV2 are set to a voltage higher than the voltage applied to transistor M2 gate terminal VG2 minus Vt so that the transistor is held in an 'off' state. The voltage applied to VG2 sets the detection threshold and is called THRESHOLD. In practice for a given silicon process, it is expected that PRV2 would be set towards the circuit supply voltage VDD, typically in the range 5-6 Volts, and PRV1 would be set according to the prevailing electro optic operating conditions typically in the range 4-6 Volts. THRESHOLD would be set typically in the range 3-4.5 Volts according to the required signal detection threshold and the average scene signal level.

The pixel output Vout connects to existing analogue output circuits (not described). Each column of pixel outputs is also connected to one input of a comparator array A1-Ac where c is the number of columns in the array. There is one comparator per column of pixel circuits. The digital output of the comparator array Dn connects to the output data register.

The circuit in FIG. 2 operates similarly to the normal imaging direct inject circuit operation technique described above. Prior to circuit operation, DIG is held off and the capacitors are reset by pulsing their respective reset transistor controls RS1 and RS2; Cint is reset to PRV1 and Ch to is reset to PRV2. THRESHOLD is held off.

Firstly a signal is acquired; the diode bias DIG is applied for the duration of the integration period Tint. When biased, photo current Iph from diode D integrates charge from Cint proportional to the signal.

Secondly, THRESHOLD is then applied to transistor M2 VG2 terminal for sufficient time to ensure a stable voltage and skim circuit operation. Signals on Cint below the detection threshold (THRESHOLD-Vt) will be insufficient to cause the transistor M2 to operate in skim mode leaving no resultant signal on Ch. Conversely, signals that are higher than the detection threshold will operate transistor M2 resulting in current flow from Ch until pinch off and signal voltage will result on capacitor Ch. The circuit has operated to detect signal information above or below the signal detection threshold and signal detection data will exist on all Ch.

Thirdly, THRESHOLD is removed from VG2 and signal detection data remains on Ch.

Fourthly, signal detection data is accessed from each row by asserting ROW_ADDR. The signal voltage on Ch Vout is developed across ILOAD and scanned out from the whole array using a conventional X-Y readout technique (not shown).

Alternatively, to achieve extremely high frame rate detection speeds, signals are processed to provide a digital output in the binary form 'signal detected, signal not detected' format.

With reference to FIG. 4, the comparators may be powered off when not needed to save power. They are powered up using the control Pup ahead of use. The Pup control may be applied ahead of point of use to ensure comparator settling time does not delay the signal processing. Each row of pixel data are accessing in sequence for processing by asserting ROWADDR. The Ch signal data is then detected using a high speed comparator An. Vout is compared against a reference voltage Vref. The reference voltage is set to determine the signal detection threshold considering the average scene levels and variation in other parameters such as scene offset voltages and comparator offset voltage. The comparator output is asserted for target signals exceeding the threshold and is retracted for the range of signals below the threshold level or vice versa. The comparator digital output data Dn is latched into an output data register as each row is addressed using the parallel load PL signal. The comparators are then powered down. Data is output during the readout time from the register at DOUT using the high speed data clock DoutCk. Each row in the 2D array is addressed and output as an analogue signal level or as digital detected target data in a sequence. The sequence is repeated for the next row. It will be appreciated that depending on the comparator implementation and speed it may be advantageous to keep the comparators powered.

The comparator is able to operate very fast as the signal dynamics are significantly faster and operate to only two levels avoiding the need for input signal to settle. It will be appreciated that the scheme could be extended to provide a number of levels, say 4 at expense of increased data bandwidth and frame rate. Comparators would compare the detected signal on Ch to other voltage thresholds (Vref2 etc. . . . ) to provide other additional digital information on signal magnitude output in a similar way. It is expected the circuit can be operated at 100 MHz achieving a full TV readout time of around 3 ms with a single digital output or less than 0.5 ms using 8 digital outputs enabling operation at frame rates well over 1 kHz.

It should be noted that the digital target detection function operates in addition to normal conventional IR detector imaging operation. Also, following digital target signal detection operation, the pixel circuits may be configured to provide analogue signals from the same image data on Cint by operating transistor M2 as a switch. Signal data will charge share with Ch and the resultant image data may then be readout from the detector using a conventional X-Y scan approach.

It is possible to simplify the pulsed operation of THRESHOLD by applying it as a DC bias when operating in signal detection mode as shown in FIG. 3. Operating in a 'skim sampling' mode, as signals exceed the detection threshold the skim operation will occur achieving an auto detect function and the same detection result. Circuit operation and performance are improved as bias and signal settling requirements for this input are removed.

Operating in skim sampling mode, with reference to FIG. 3, DIG is retracted and the capacitors are again reset to their respective Pixel Reset Voltage levels (PRV1 and PRV2). THRESHOLD bias is applied to VG2. The capacitor reset transistors are operated using the controls RS1 and RS2 and the reset voltages appear on Cint and Ch. As the transistor source and drain voltages are higher than the gate voltage THRESHOLD-Vt the transistor is off and there is no current flow. DIG is asserted and a photo current signal Iph is acquired on Cint as described above, Vsignal. During charge integration, the voltage on Cint falls at a low rate depending on a number of parameters including the background scene temperature. However, when a higher signal is imaged, then the signal change falls below the skim threshold (THRESHOLD-Vt) and the transistor turns on also integrating charge the hold capacitor Ch resulting in signal threshold data directly on Ch, Vdetect. Signals below the threshold do not affect Ch. Analogue signal level data Vout is output conventionally. Digital target detection data DOUT is generated and output as previously described.

Using a DC bias to set the threshold level simplifies circuit design as widely known precision power supply design techniques can be used and performance will improve as electrical noise can therefore be reduced which improved stability of the detection threshold It will be appreciated that other pixel circuit designs can be used to generate signal voltages on Cint that can then be processed using the skim threshold detection technique.

It will be appreciated that the pixel circuit may be configured and used at other voltages than those indicated above.

This IR detector technology can be used for normal thermal imaging operation and for target detection applications either separately or in combination. The signal threshold detection technique and digital readout method embodied in the typical circuits above provides a means to deliver high speed data enabling detector operation at extremely high frame rates as required by applications such as detecting weapon muzzle flash or projectile trajectories. This technology is expected to provide a step change capability for hostile target detection.

The invention claimed is:

1. An infra red (IR) detector system comprising:
   at least one comparator;
   a Focal Plane Array (FPA) detector pixel, the FPA detector pixel including a circuit having a direct inject transistor, an integration capacitor, a first reset transistor, and an output source follower, the FPA detector pixel also has a skim circuit including a transistor switch connected to a terminal of the direct inject transistor, a storage capacitor connected to the transistor switch, and a second reset transistor configured to reset the storage capacitor, wherein a gate of the transistor switch is configured to receive an intermediate voltage for operating the skim circuit in a skim mode based on a bias property of the transistor switch; and
   wherein the at least one comparator detects signals by comparing the signal in the storage capacitor to a reference voltage, which establishes a signal detection threshold for the at least one comparator based on average scene levels, scene offset voltages, and a comparator offset voltage,
   wherein the skim circuit is configured to have an Integrate while Read function that enables in-pixel signal processing such that signals over a certain level are identified by the comparator.

2. An IR detector system according to claim 1 comprising:
   a control voltage input to set a signal detection threshold of the FPA proportional to an average scene signal level.

3. An IR detector system according to claim 1 in which the skim circuit comprises:
   a skim detection transistor to auto detect signals by threshold detection.

4. An IR detector system according to claim 1 in which the skim circuit is configured to receive a DC bias so that a charge can be transferred from the integration capacitor to the storage capacitor.

5. An IR detector system according to claim 1 comprising:
   a comparator circuit for generating binary target detection signal information.

6. An IR detector system according to claim 1 comprising:
   an output for signal detection data in a digital form.

7. A method for infra red detection in a Focal Plane Array (FPA) having the FPA detector pixel including a circuit having a direct inject transistor, an integration capacitor, a first reset transistor, and an output source follower, the FPA detector pixel also has a skim circuit including a transistor switch connected to a terminal of the direct inject transistor, a storage capacitor connected to the transistor switch, and a second reset transistor configured to reset the storage capacitor, wherein a gate of the transistor switch is configured to receive an intermediate voltage for operating the skim circuit in a skim mode based on a bias property of the transistor switch, the method comprising:
   applying an intermediate voltage that is greater than a threshold voltage to the gate of the transistor switch; and
   detecting a signal input to the direct inject transistor of the FPA detector pixel by comparing the signal in the storage capacitor to a reference voltage, which establishes a signal detection threshold for the at least one comparator based on average scene levels, scene offset voltages, and a comparator offset voltage.

* * * * *